United States Patent
Kajino

(10) Patent No.: US 11,515,812 B2
(45) Date of Patent: Nov. 29, 2022

(54) CONTROL METHOD FOR PIEZOELECTRIC DRIVE DEVICE, PIEZOELECTRIC DRIVE DEVICE, AND ROBOT

(71) Applicant: SEIKO EPSON CORPORATION, Tokyo (JP)

(72) Inventor: Kiichi Kajino, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 145 days.

(21) Appl. No.: 17/126,047

(22) Filed: Dec. 18, 2020

(65) Prior Publication Data
US 2021/0194389 A1 Jun. 24, 2021

(30) Foreign Application Priority Data
Dec. 20, 2019 (JP) .............................. JP2019-230203

(51) Int. Cl.
*H02N 2/14* (2006.01)
*B25J 9/12* (2006.01)
*H02N 2/10* (2006.01)

(52) U.S. Cl.
CPC ................ *H02N 2/145* (2013.01); *B25J 9/12* (2013.01); *H02N 2/103* (2013.01)

(58) Field of Classification Search
CPC ...... H02N 2/145; H02N 2/103; H02N 2/0025; H02N 2/142; H02N 2/02; H02N 2/04; H02N 2/062; B25J 9/12
See application file for complete search history.

(56) References Cited

U.S. PATENT DOCUMENTS 9,318,980 B2 * 4/2016 Urano ....................... B25J 15/00
11,203,040 B2 * 12/2021 Kajino .................... H02N 2/103

FOREIGN PATENT DOCUMENTS

JP H06269179 A 9/1994

* cited by examiner

*Primary Examiner* — Emily P Pham
(74) *Attorney, Agent, or Firm* — Gang Yu

(57) ABSTRACT

A control method for a piezoelectric drive device includes a first step of executing first control to decrease a frequency of a drive voltage applied to a piezoelectric vibrator from a predetermined first frequency while acquiring a pickup voltage representing vibration amplitude of the piezoelectric vibrator, and a second step of executing second control to increase the frequency of the drive voltage applied to the piezoelectric vibrator to a second frequency as a frequency of the drive voltage applied before a second time when the pickup voltage is higher from a first time to the second time and the pickup voltage is lower from the second time to a third time.

7 Claims, 12 Drawing Sheets

CONTROL METHOD FOR PIEZOELECTRIC DRIVE DEVICE, PIEZOELECTRIC DRIVE DEVICE, AND ROBOT

The present application is based on, and claims priority from JP Application Serial Number 2019-230203, filed Dec. 20, 2019, the disclosure of which is hereby incorporated by reference herein in its entirety.

BACKGROUND

1. Technical Field

The present disclosure relates to a control method for a piezoelectric drive device, a piezoelectric drive device, and a robot.

2. Related Art

Regarding a control method for a piezoelectric drive device, for example, JP-A-6-269179 discloses a control method for an ultrasonic motor including a vibrator having an elastic body and a piezoelectric element, and a rotor in pressure contact with the vibrator. JP-A-6-269179 discloses a technique, in control to increase vibration amplitude to target amplitude by reducing a drive frequency from a high-frequency side, of reducing the target amplitude to the maximum value of the vibration amplitude when it is anticipated that the vibration amplitude does not reach the predetermined target amplitude.

However, the relationship between the maximum value of the vibration amplitude as the target amplitude and the drive frequency of the vibrator may vary due to temperature changes of the vibrator or the like. Accordingly, when the vibrator is controlled based on the target amplitude, appropriate setting of the drive frequency may be difficult.

SUMMARY

According to a first aspect of the present disclosure, a control method for a piezoelectric drive device is provided. The control method includes a first step of executing first control to decrease a frequency of a drive voltage applied to a piezoelectric vibrator from a predetermined first frequency while acquiring a pickup voltage representing vibration amplitude of the piezoelectric vibrator, and a second step of executing second control to increase the frequency of the drive voltage applied to the piezoelectric vibrator to a second frequency as a frequency of the drive voltage applied before a second time when, in the first control, the pickup voltage is higher from a first time to the second time and the pickup voltage is lower from the second time to a third time in the first control.

According to a second aspect of the present disclosure, a piezoelectric drive device that drives a driven member is provided. The piezoelectric drive device includes a piezoelectric vibrator that drives the driven member, and a control unit, wherein the control unit executes first control to decrease a frequency of a drive voltage applied to the piezoelectric vibrator from a predetermined first frequency while acquiring a pickup voltage representing vibration amplitude of the piezoelectric vibrator from the piezoelectric vibrator, and second control to increase the frequency of the drive voltage applied to the piezoelectric vibrator to a second frequency as a frequency of the drive voltage applied before a second time when, in the first control, the pickup voltage is higher from a first time to the second time and the pickup voltage is lower from the second time to a third time in the first control.

According to a third aspect of the present disclosure, a robot including the piezoelectric drive device in the above described second aspect is provided.

DESCRIPTION OF EXEMPLARY EMBODIMENTS

A. First Embodiment

Figure 1:
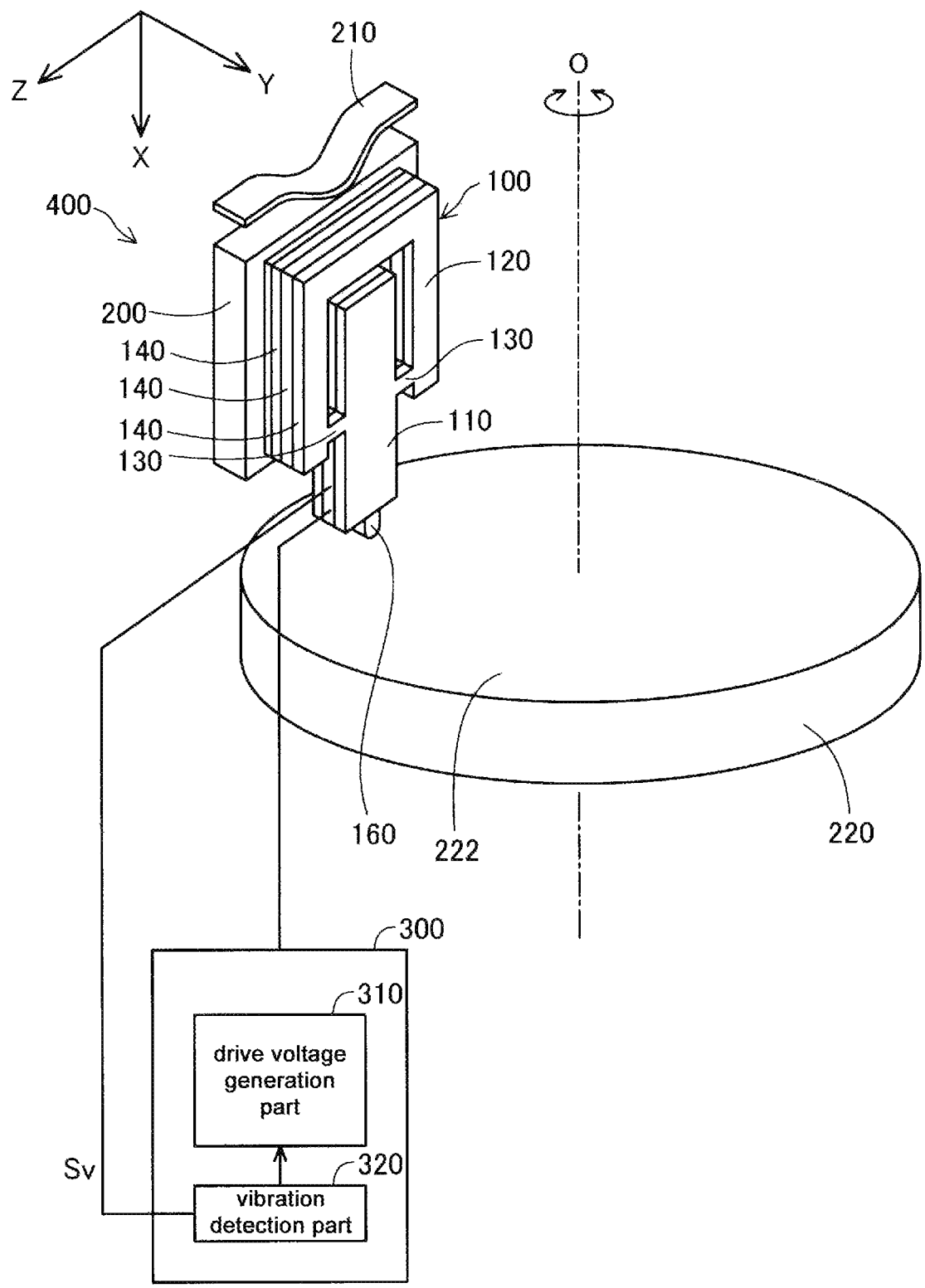
FIG. 1 is a perspective view showing a drive mechanism including a piezoelectric drive device of a first embodiment.

FIG. 1 is a perspective view showing a drive mechanism including a piezoelectric drive device 400 of a first embodiment. The piezoelectric drive device 400 includes a piezoelectric vibrator 100 that drives a driven member 220, and a control unit 300 that electrically drives the piezoelectric vibrator 100. In FIG. 1, as the driven member 220, a rotor rotatable about a rotation axis O is shown. As the driven member 220, other types of members including a linearly movable member can be used. Note that a plurality of the piezoelectric vibrators 100 may be provided for the single driven member 220.

The piezoelectric vibrator 100 has a vibrating portion 110 that can vibrate, a supporting portion 120 that supports the vibrating portion 110, and a pair of coupling portions 130 that couple the vibrating portion 110 and the supporting portion 120. The vibrating portion 110 has a substantially rectangular plate-like shape. A contact 160 that can contact the driven member 220 is provided on an end of the vibrating portion 110. The contact 160 is formed using e.g. ceramics having higher wear resistance and bonded to the vibrating portion 110.

The supporting portion 120 of the piezoelectric vibrator 100 has a U-shape surrounding a part of the vibrating portion 110 opposite to the contact 160. The supporting portion 120 is fixed to a stage 200 as a supporting member. The stage 200 is pressed toward the driven member 220 side by a spring member 210. Here, a structural member fixing the spring member 210 is not shown.

A tip end of the contact 160 contacts a surface 222 of the driven member 220. The piezoelectric vibrator 100 is pressed toward the driven member 220 side by the spring member 210, and thereby, the contact 160 contacts the surface 222 of the driven member 220 with a sufficient frictional force. Accordingly, slipping may be suppressed and the vibration of the vibrating portion 110 may be efficiently transmitted to the driven member 220 via the contact 160.

As below, for convenience of explanation, the longitudinal directions of the vibrating portion 110 in which the vibrating portion 110 and the driven member 220 are arranged are referred to as "X-axis directions". The +X-axis direction is a direction from the vibrating portion 110 toward the driven member 220, and the −X-axis direction is an opposite direction to the +X-axis direction. The X-axis directions include both directions of the +X-axis direction and the −X-axis direction. Thickness directions of the piezoelectric vibrator 100 crossing the X-axis directions are referred to as "Y-axis directions". The +Y-axis direction is a direction from the piezoelectric drive device 400 toward the rotation axis O of the driven member 220, and the −Y-axis direction is an opposite direction to the +Y-axis direction. The Y-axis directions include both directions of the +Y-axis direction and the −Y-axis direction. Width directions of the vibrating portion 110 crossing the X-axis directions and the Y-axis directions are referred to as "Z-axis directions". The +Z-axis direction is a leftward direction as seen from the rotation axis O of the driven member 220 in FIG. 1, and the −Z-axis direction is an opposite direction to the +Z-axis direction. The Z-axis directions include both directions of the +Z-axis direction and the −Z-axis direction. In the embodiment, the X-axis directions, the Y-axis directions, and the Z-axis directions are orthogonal to one another.

The piezoelectric vibrator 100 has a plurality of piezoelectric vibrator modules 140 stacked in the Y-axis directions. In the example shown in FIG. 1, the number of the piezoelectric vibrator modules 140 is three. The plurality of piezoelectric vibrator modules 140 are joined by electrically insulating joining members such as adhesives. Note that the piezoelectric vibrator 100 may include the single piezoelectric vibrator module 140.

The plurality of piezoelectric vibrator modules 140 are coupled to the control unit 300. The control unit 300 has a drive voltage generation part 310 and a vibration detection part 320. The drive voltage generation part 310 has a function of supplying a drive voltage to a piezoelectric element provided in the piezoelectric vibrator 100. The vibration detection part 320 is coupled to a pickup electrode provided in the piezoelectric vibrator 100 and has function of detecting vibration amplitude of the piezoelectric vibrator 100. The drive voltage generation part 310 adjusts the frequency of the drive voltage according to a pickup voltage Sv supplied from the pickup electrode to the vibration detection part 320, and supplies the drive voltage to the piezoelectric element. Hereinafter, the frequency of the drive voltage is also simply referred to as "drive frequency". The pickup voltage Sv is also referred to as "vibration detection signal".

The control unit 300 is formed using a circuit that realizes the above described functions of the drive voltage generation part 310 and the vibration detection part 320. The details of the operation of the control unit 300 will be described later. Note that part or all of the above described functions of the control unit 300 may be realized as software by a CPU provided in the control unit 300 executing programs stored in a memory.

Figure 2:
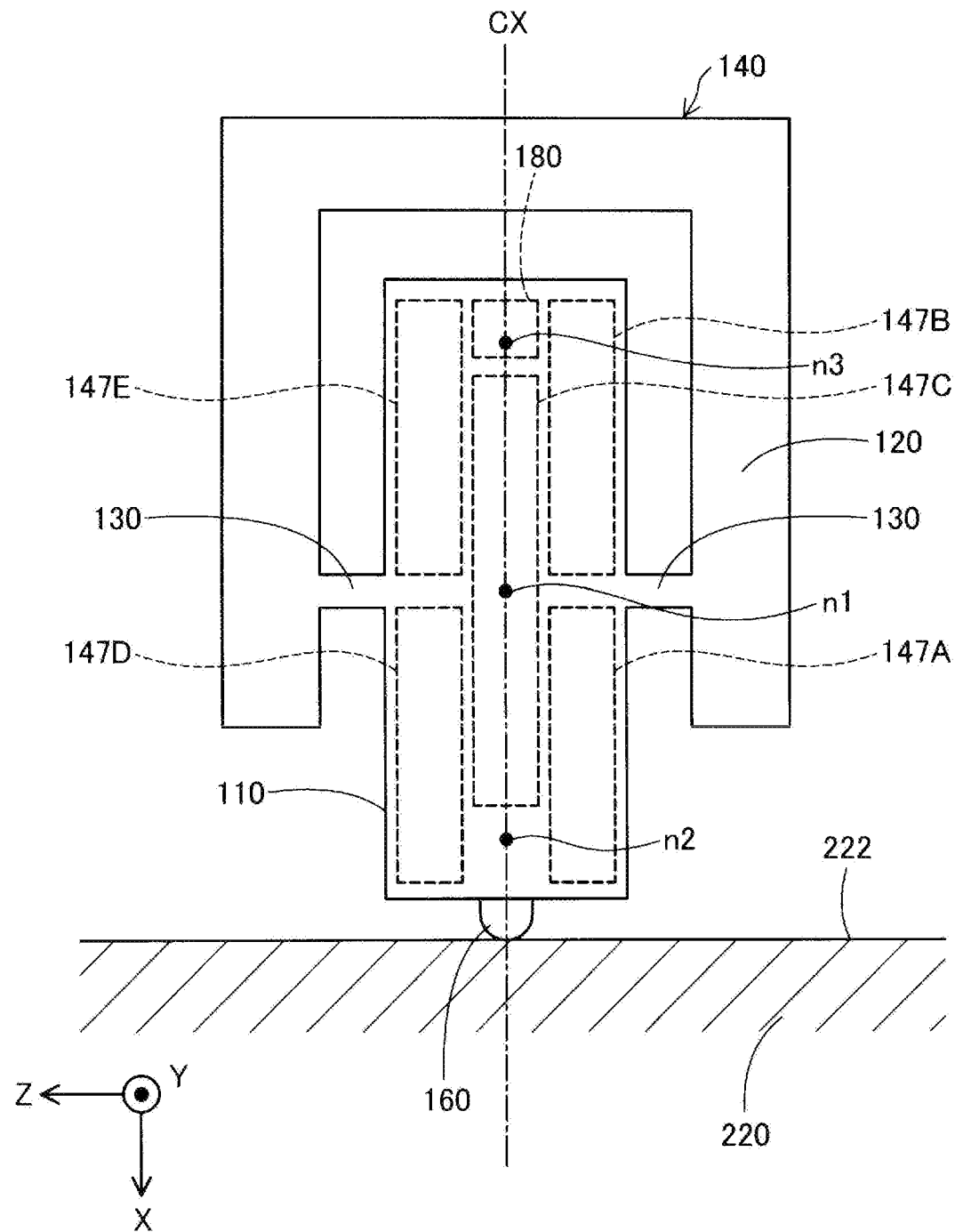
FIG. 2 is a plan view showing an example of a piezoelectric vibrator module.

FIG. 2 is a plan view showing an example of the piezoelectric vibrator module 140. The vibrating portion 110 of the piezoelectric vibrator module 140 includes five piezoelectric elements 147A to 147E. The pair of piezoelectric elements 147A, 147E on one diagonal line of the rectangular vibrating portion 110 simultaneously expand and contract in the X-axis directions and generate flexural vibration in the vibrating portion 110. The other pair of piezoelectric elements 147B, 147D on the other diagonal line of the vibrating portion 110 also simultaneously expand and contract in the X-axis directions and generate flexural vibration in the vibrating portion 110. Note that it is preferable that the expansion and contraction of the pair of piezoelectric elements 147A, 147E and the expansion and contraction of the other pair of piezoelectric elements 147B, 147D are different in phase by 180 degrees. The piezoelectric element 147C at the center in the width directions of the vibrating portion 110 expands and contracts in the X-axis directions and generates longitudinal vibration in the X-axis directions in the vibrating portion 110.

Each of the piezoelectric elements 147A to 147E has a piezoelectric material and two electrodes sandwiching the piezoelectric material from both surfaces. As a constituent material for the piezoelectric material, piezoelectric ceramics including e.g. lead zirconate titanate, barium titanate, lead titanate, potassium niobate, lithium niobate, lithium tantalate, sodium tungstate, zinc oxide, barium strontium titanate, strontium bismuth tantalate, lead metaniobate, and lead scandium niobate may be used. For example, the piezoelectric material formed using the piezoelectric ceramics may be formed from a bulk material or using the so-gel method or sputtering method. Note that, as the constituent material for the piezoelectric material, polyvinylidene fluoride, quartz crystal, or the like may be used in addition to the above described piezoelectric ceramics.

The piezoelectric vibrator module 140 further has a pickup electrode 180. The pickup electrode 180 is an electrode for detecting the vibration of the piezoelectric vibrator 100 and supplying the pickup voltage Sv to the control unit 300. In the example of FIG. 2, the pickup electrode 180 is provided at the upside of the piezoelectric element 147C at the center of the vibrating portion 110. Note that one pickup electrode 180 may be provided at each of the upside and the downside of the piezoelectric element 147C.

Figure 3:
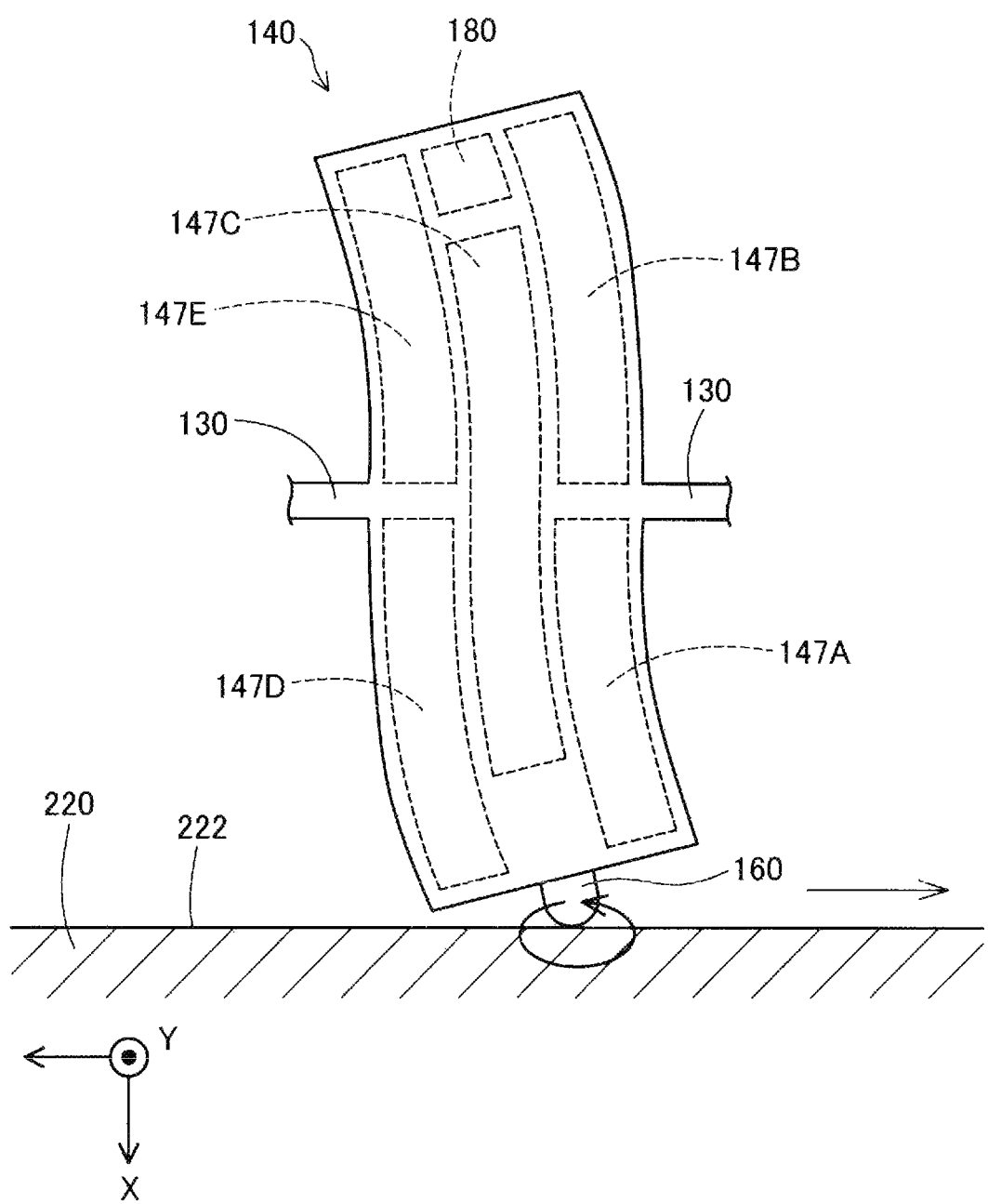
FIG. 3 is a conceptual diagram showing vibration of the piezoelectric vibrator module.

FIG. 3 is a conceptual diagram showing vibration of the piezoelectric vibrator module 140. The piezoelectric vibrator module 140 may vibrate to make elliptic motion of the contact 160. The elliptic motion is realized by generation of flexural vibration by expansion and contraction of the pair of piezoelectric elements 147A, 147E and expansion and contraction of the other pair of piezoelectric elements 147B, 147D and generation of longitudinal vibration by expansion and contraction of the piezoelectric element 147C at the center. "Flexural vibration" refers to vibration in which the piezoelectric vibrator module 140 flexes in an S-shape as shown in FIG. 3 within a plane of the piezoelectric vibrator module 140. "Longitudinal vibration" refers to vibration in which the piezoelectric vibrator module 140 expands and contracts in the X-axis directions. The whole piezoelectric vibrator 100 vibrates in the same manner as the piezoelectric vibrator modules 140. The four piezoelectric elements 147A, 147B, 147D, 147E generate flexural vibration and are also referred to as "first piezoelectric elements". The piezoelectric element 147C generates longitudinal vibration and is also referred to as "second piezoelectric element". The numbers of the first piezoelectric elements 147A, 147B, 147D, 147E and the second piezoelectric element 147C are just examples, and the numbers of the first piezoelectric elements and the second piezoelectric element can be appropriately set to other values. For example, the pair of piezoelectric elements 147A, 147B may be omitted and the other pair of piezoelectric elements 147D, 147E may generate flexural vibration.

Figure 4:
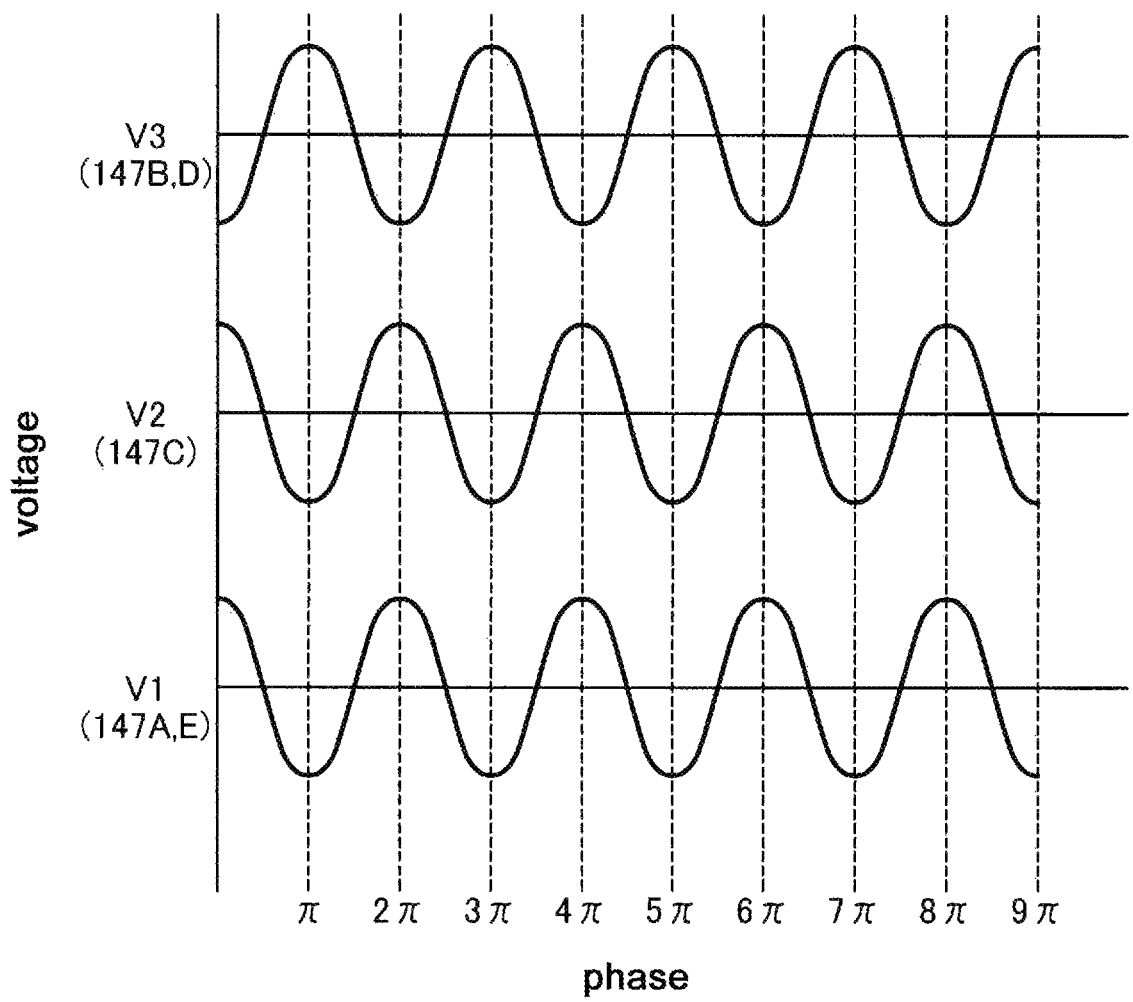
FIG. 4 shows examples of waveforms of drive voltages supplied to piezoelectric elements.

FIG. 4 shows examples of waveforms of drive voltages supplied to the piezoelectric elements 147A to 147E. A drive voltage V1 is applied to the pair of piezoelectric elements 147A, 147E, a drive voltage V2 is applied to the piezoelectric element 147C, and a drive voltage V3 is applied to the other pair of piezoelectric elements 147B, 147D. Note that the drive voltage V3 is a voltage formed with a phase change of π, i.e., 180 degrees from the drive voltage V1 and substantially equal to the drive voltage V1. These drive voltages V1, V3 are drive voltages for generating flexural vibration in the piezoelectric vibrator module 140 and also referred to as "first drive voltages". The drive voltage V2 is a drive voltage for generating longitudinal vibration in the piezoelectric vibrator module 140 and also referred to as "second drive voltage". Note that the frequencies of the first drive voltages V1, V3 and the frequency of the second drive voltage V2 are normally set to equal values.

As shown in FIG. 3, the piezoelectric vibrator module 140 vibrates to make elliptic motion of the contact 160 by synthesis of the flexural vibration and the longitudinal vibration. As described above, the pair of piezoelectric elements 147A, 147E, the other pair of piezoelectric elements 147B, 147D, and the piezoelectric element 147C are expanded and contracted by the drive waveforms shown in FIG. 4, and thereby, the contact 160 may be vibrated along an elliptic trajectory. Note that other various waveforms than those shown in FIG. 4 can be used for the waveforms of the drive voltages of the piezoelectric vibrator module 140 as long as the contact 160 may be vibrated along an elliptic trajectory. For example, the drive voltage may contain a direct-current component in addition to the alternating-current component. In this case, "frequency of drive voltage" refers to the frequency of the alternating-current component.

As shown in FIG. 2, it is preferable that the pickup electrode 180 is placed in a position on a center axis CX of the piezoelectric vibrator 100 extending along the X-axis directions in a plan view. The center axis CX is located in a position that coincides with the center axis of the vibrating portion 110 in the plan view. The placement of the pickup electrode 180 in a position on the center axis CX of the piezoelectric vibrator 100 has an advantage that accurate detection of longitudinal vibration is easy because of the less influence by flexural vibration. Further, it is preferable that the pickup electrode 180 is placed in a position of one of nodes n1, n2, n3 of flexural vibration. In the example of FIG. 2, the node n1 of flexural vibration exists at the center of the vibrating portion 110 and the other two nodes n2, n3 exist in positions near the ends of the vibrating portion 110 on the center axis CX. The placement of the electrode 180 in the position of one of the nodes n1, n2, n3 of flexural vibration has an advantage that the detection of the longitudinal vibration of the piezoelectric vibrator 100 is easier because of the further reduced influence by flexural vibration. Of the nodes n1, n2, n3, the influence by the flexural vibration may be the minimum at the node n1. The node n1 is nearest the coupling portions 130 and most hardly affected by flexural vibration of the nodes n1, n2, n3. Note that the pickup electrode 180 may be placed in another place than those.

A drive voltage Vd generated in the drive voltage generation part 310 shown in FIG. 1 corresponds to one of the three drive voltages V1 to V3 shown in FIG. 4. The control unit 300 may have three drive voltage generation parts 310 for generation of the drive voltages V1 to V3. Or, the drive voltage generation part 310 may include a phase adjustment circuit and generate the three drive voltages V1 to V3 shown in FIG. 4 from one drive voltage by adjusting the phase of the drive voltage Vd generated in the drive voltage generation part 310 using the phase adjustment circuit. As below, the operation of the piezoelectric drive device 400 will be explained assuming that the drive voltage V2 applied to the piezoelectric element 147C is the drive voltage Vd representing the drive voltage generated in the drive voltage generation part 310.

Figure 5:
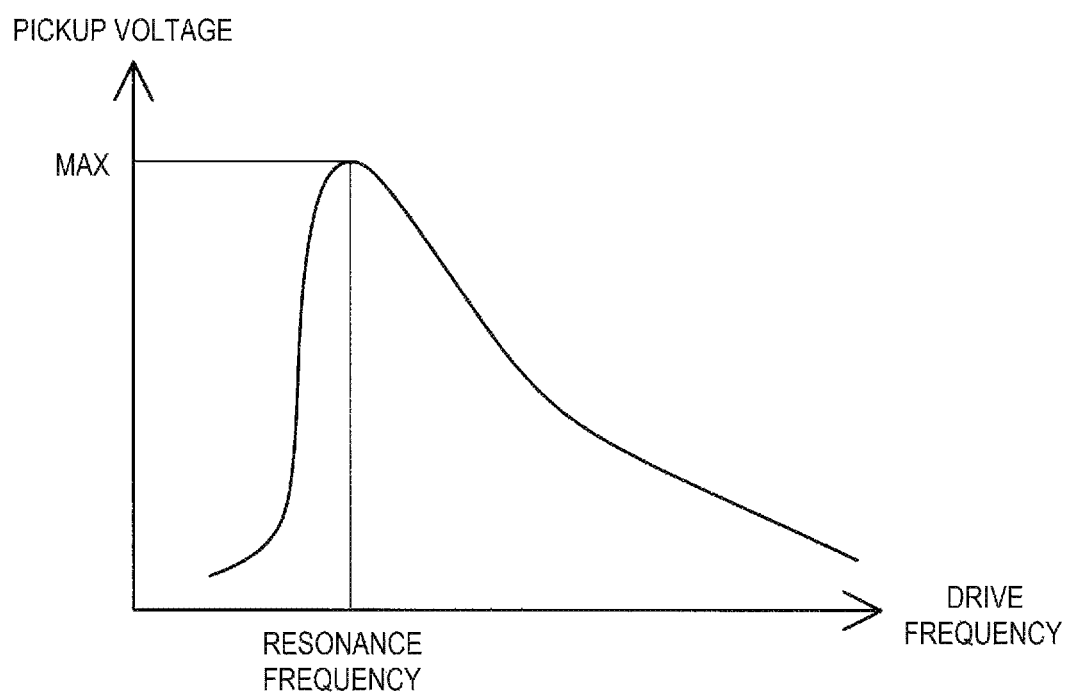
FIG. 5 is a graph showing operating characteristics of the piezoelectric drive device.

FIG. 5 is a graph showing operating characteristics of the piezoelectric drive device 400 in the first embodiment. The horizontal axis indicates the drive frequency of the piezoelectric vibrator 100 and the frequency is higher toward the right side. The vertical axis indicates the pickup voltage output from the pickup electrode 180 and the voltage is higher toward the upside. The larger value of the pickup voltage represents the larger vibration amplitude of the piezoelectric vibrator 100.

In the driving state of the piezoelectric vibrator 100, the pickup voltage is the highest at a resonance frequency of the piezoelectric vibrator 100. That is, the drive frequency is adjusted to the resonance frequency of the piezoelectric vibrator 100, and thereby, the vibration amplitude of the piezoelectric vibrator 100 is the maximum. When the drive frequency becomes lower than the resonance frequency, the pickup voltage rapidly becomes lower. That is, when the drive frequency is set to be lower than the resonance frequency, the vibration amplitude of the piezoelectric vibrator 100 may be extremely small and driving of the driven member 220 may be harder. Accordingly, it is preferable that the control unit 300 sets the drive frequency to a drive frequency higher than the resonance frequency at which desired vibration amplitude is obtained and vibrates the piezoelectric vibrator 100.

Figure 6:
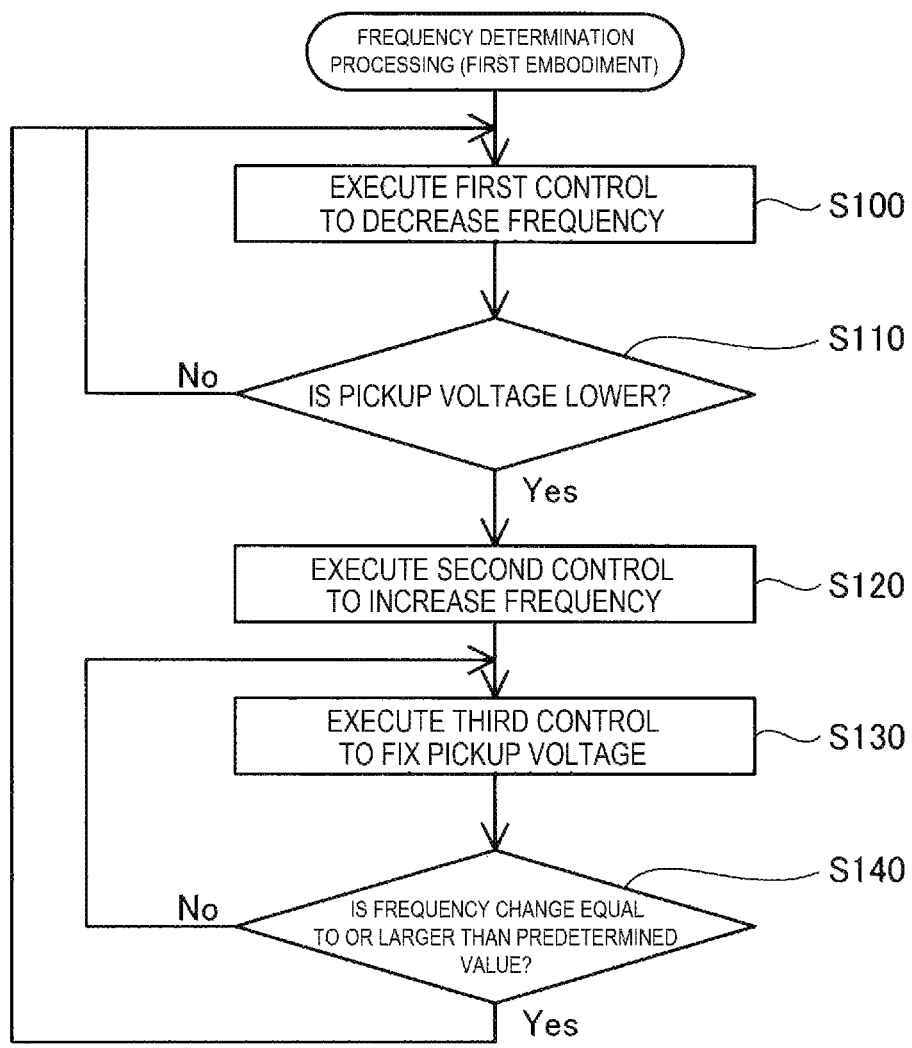
FIG. 6 is a flowchart of frequency determination processing.
Figure 7:
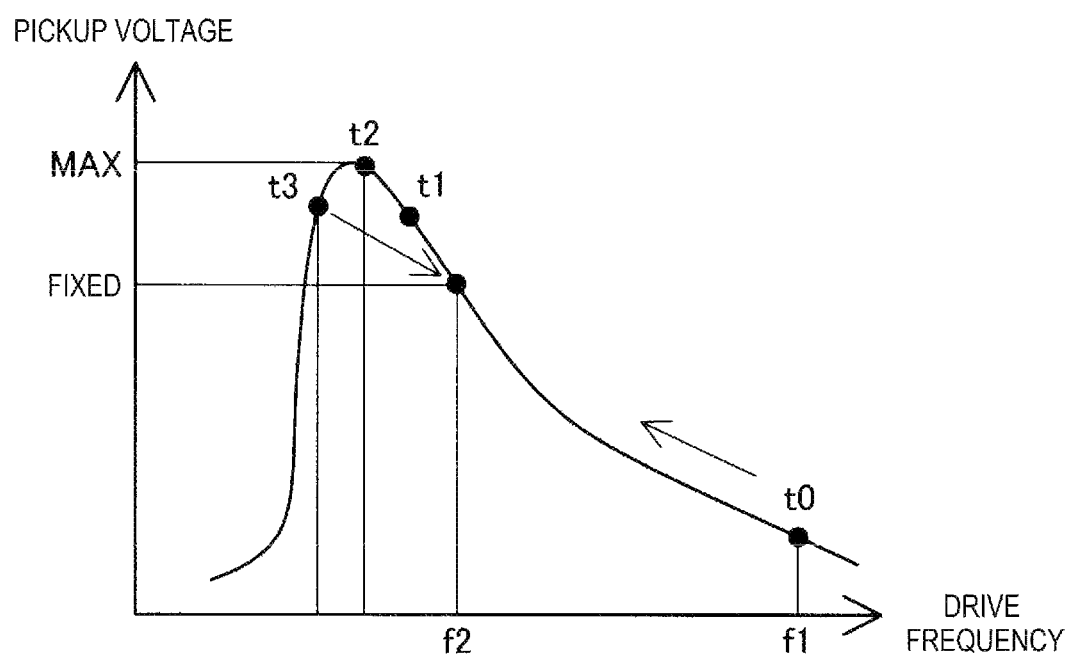
FIG. 7 is an explanatory diagram showing details of processing of the frequency determination processing.

FIG. 6 is a flowchart of frequency determination processing executed by the control unit 300. The flowchart shows a control method for the piezoelectric drive device 400. FIG. 7 is an explanatory diagram showing details of processing of the frequency determination processing. The frequency determination processing is started after time t0 when power of the piezoelectric drive device 400 is turned on.

At step S100, the control unit 300 executes first control to decrease the frequency of the drive voltage applied to the piezoelectric vibrator 100 from a predetermined first frequency f1 as a frequency at a high-frequency side while acquiring the pickup voltage representing the vibration amplitude of the piezoelectric vibrator 100 from the pickup electrode 180. The processing at step S100 is also referred to as "first step". Further, the first control is also referred to as "down-sweep control". As shown in FIG. 7, the first frequency f1 is higher than the resonance frequency of the piezoelectric vibrator 100. At the first frequency f1, the pickup voltage is lower than the maximum pickup voltage MAX at the resonance frequency.

At step S110, the control unit 300 determines whether or not the pickup voltage becomes lower by the first control. More specifically, as shown in FIG. 7, the control unit 300 determines whether or not the pickup voltage becomes higher from first time t1 to second time t2 and the pickup voltage becomes lower from the second time t2 to third time t3. The first time t1, the second time t2, and the third time t3 are e.g. continuous times in the execution cycle of the frequency determination processing, and the difference between the first time t1 and the second time t2 and the difference between the second time t2 and the third time t3 are equal.

At step S110, when a determination that the pickup voltage does not become lower is made, the frequency adjusted at step S100 does not reach the resonance frequency. In this case, the control unit 300 returns the processing to step S100 and decreases the frequency by the first control again.

At step S110, when a determination that the pickup voltage becomes lower is made, the frequency adjusted at step S100 is lower than the resonance frequency. In this case, at step S120, the control unit 300 executes second control to increase the frequency of the drive voltage applied to the piezoelectric vibrator 100 to a second frequency f2 as a frequency of the drive voltage applied before the second time t2. As shown in FIG. 7, in the embodiment, the second frequency f2 is a frequency of the drive voltage applied to the piezoelectric vibrator 100 before the first time t1. Further, in the embodiment, the second frequency f2 is lower than the first frequency f1. The processing at step S120 is also referred to as "second step".

At step S130, the control unit 300 executes third control to adjust the drive frequency to fix the pickup voltage. Specifically, the control unit 300 performs control to increase or decrease the drive frequency to fix the pickup voltage immediately after the execution of the second control at step S120. More specifically, the control unit 300 performs control to increase the drive frequency to decrease the pickup voltage when the pickup voltage rises and decrease the drive frequency to increase the pickup voltage when the pickup voltage falls. The processing at step S130 is also referred to as "third step". The piezoelectric vibrator 100 has a property that the operating characteristics shown in FIG. 5 change according to temperature changes thereof or the like. Accordingly, in the third control, the control of the drive frequency is performed to fix the pickup voltage, and thereby, the vibration amplitude is stabilized.

At step S140, as a result of the adjustment of the drive frequency by the third control at step S120, the control unit 300 determines whether or not a difference value between the second frequency f2 immediately after the execution of step S130 and the frequency after the adjustment, i.e., the amount of change is equal to or larger than a predetermined value. "Predetermined value" at step S140 is a value determined according to whether or not the operating characteristics of the piezoelectric vibrator 100 change to a degree at which resetting of the second frequency f2 is required and determined by an experiment or simulation.

At step S140, when a determination that the amount of change of the drive frequency after adjustment is equal to or larger than the predetermined value is not made, the control unit 300 returns the processing to step S130 and continues processing of fixing the pickup voltage. On the other hand, when the determination that the amount of change of the drive frequency after adjustment is equal to or larger than the predetermined value is made, the control unit 300 returns the processing to step S100 and starts execution of the first control again. Thereby, the above described series of frequency determination processing is executed again and a new drive frequency is set.

According to the above described control method for the piezoelectric drive device 400 in the first embodiment, when the pickup voltage rises and falls in the first control to gradually decrease the drive frequency, the second control to increase the drive frequency is executed and the drive frequency of the piezoelectric vibrator 100 is set to the second frequency f2. Accordingly, for example, the drive frequency may be set more appropriately so that the drive frequency of the piezoelectric vibrator 100 may be higher than the resonance frequency with the suppressed influence by the temperature change of the piezoelectric vibrator 100 or the like than that when the drive frequency is set using the maximum value of the vibration amplitude that may be affected by the temperature change of the piezoelectric vibrator 100 or the like as the target amplitude.

In the embodiment, in the second control, the drive frequency is increased to the frequency applied before the time t1 as the time before the pickup voltage falls, and thereby, the drive frequency of the piezoelectric vibrator 100 may be reliably set to a higher frequency than the resonance frequency. As a result, the drive frequency is not set to be lower than the resonance frequency, and thus, a situation that the driven member 220 is not driven by the piezoelectric vibrator 100 may be suppressed.

In the embodiment, the second frequency f2 set by the second control is lower than the first frequency f1 as a base point at which decrease of the frequency is started in the first control, and thus, the piezoelectric vibrator 100 may be driven more efficiently than that at the start point of the adjustment of the drive frequency.

In the embodiment, the third control to adjust the drive frequency to fix the pickup voltage is executed after the second control, and thereby, a drive force for the driven member 220 by the piezoelectric vibrator 100 may be kept constant. Further, in the embodiment, during the execution of the third control, when the drive frequency being adjusted varies by a predetermined value or more from the drive frequency at the start of the third control, the first control to decrease the frequency is executed, and thus, even when the operating characteristics of the piezoelectric vibrator 100 vary due to temperature changes or the like, the drive frequency may be appropriately reset.

B. Second Embodiment

Figure 8:
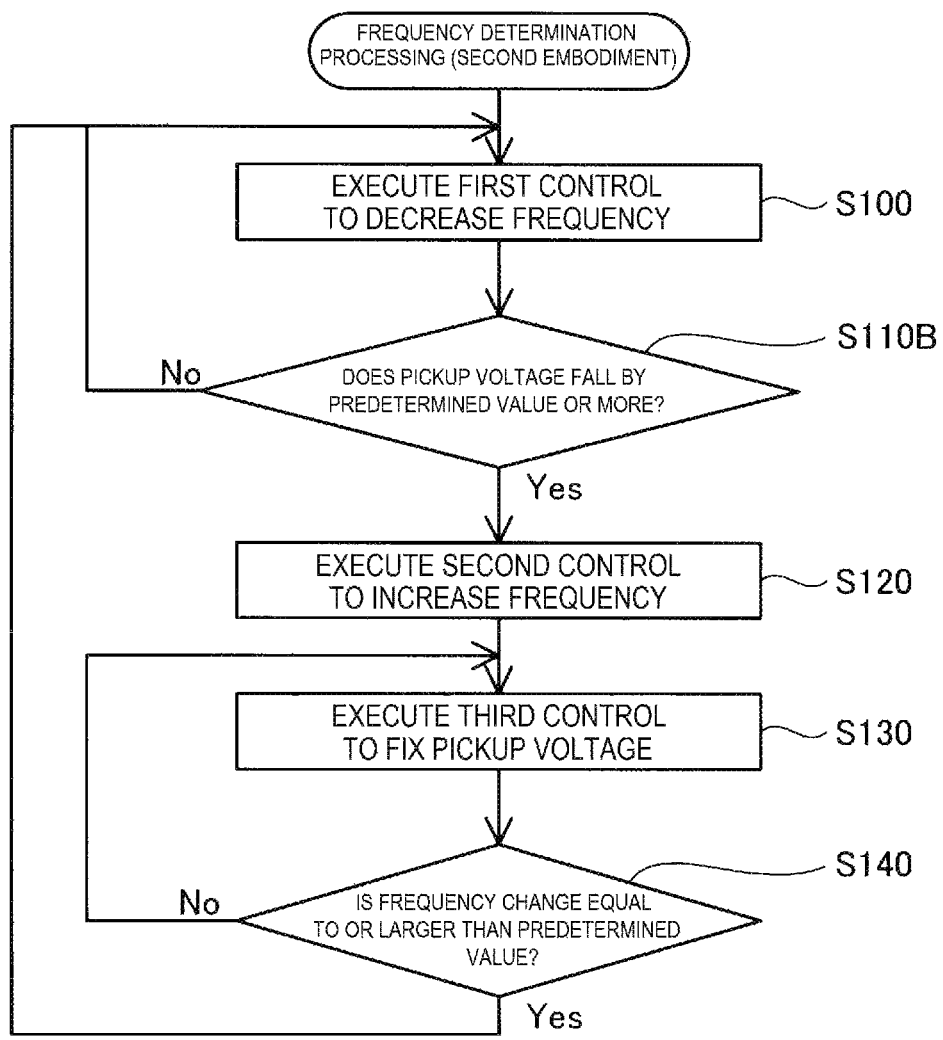
FIG. 8 is a flowchart of frequency determination processing in a second embodiment.
Figure 9:
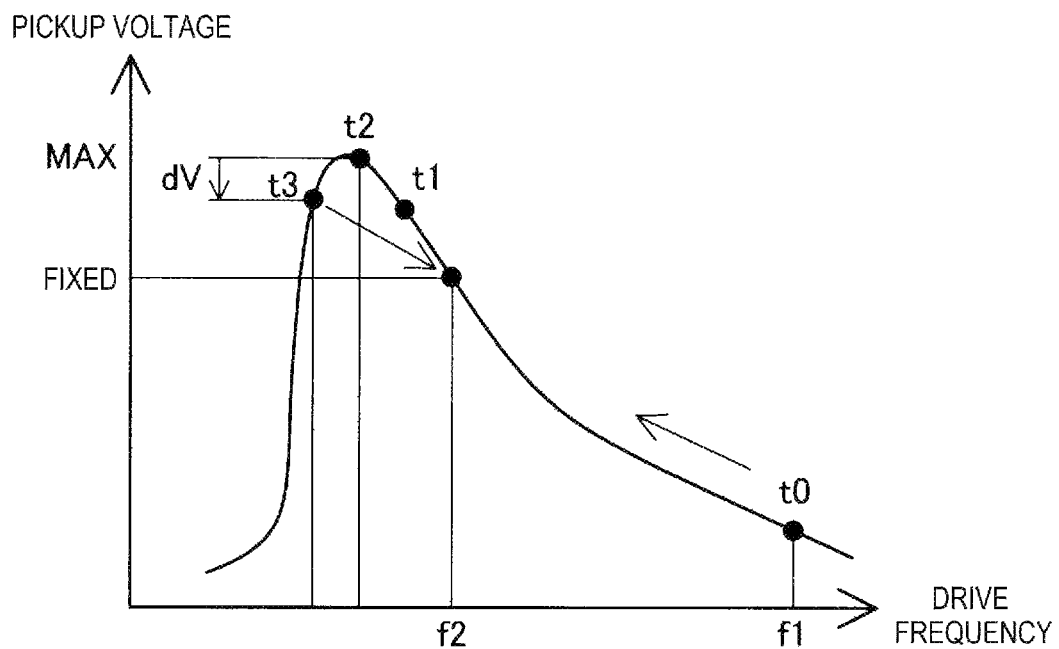
FIG. 9 is an explanatory diagram showing details of processing of the frequency determination processing in the second embodiment.

FIG. 8 is a flowchart of frequency determination processing in a second embodiment. FIG. 9 is an explanatory diagram showing details of processing of the frequency determination processing in the second embodiment. The configuration of the piezoelectric drive device 400 in the embodiment is the same as that of the first embodiment, however, part of the processing of the frequency determination processing is different. Accordingly, as below, the explanation of the configuration of the piezoelectric drive device 400 will be omitted and differences from the first embodiment will be explained regarding the frequency determination processing.

In the second embodiment, in the frequency determination processing, the control unit 300 executes the first control at step S100 to decrease the drive frequency. Then, the control unit 300 determines whether or not the pickup voltage falls by a predetermined value or more at step S110B. Specifically, as shown in FIG. 9, the control unit 300 determines whether or not an amount dV of increase of the pickup voltage from a first time t1 to a second time t2 and decrease from the second time t2 to a third time t3, i.e., an amount of change dV of the pickup voltage is equal to or larger than a predetermined value.

At the step S110B, when a determination that the pickup voltage falls by the predetermined value or more is made, the control unit 300 executes the second control to increase the drive frequency to the second frequency f2 and executes the third control to fix the pickup voltage at the time as is the case with the first embodiment.

According to the above described control method for the piezoelectric drive device 400 of the second embodiment, the second control to increase the drive frequency is executed when the pickup voltage falls by the predetermined value or more from the second time t2 to the third time t3, and thus, the drive frequency may be set to an appropriate value after reliable detection of the drive frequency lower than the resonance frequency. Note that, as "predetermined value" for comparison with the amount of decrease dV of the pickup voltage, a value with which the drive frequency decreased from the high-frequency side is lower than the resonance frequency may be reliably detected may be obtained and set by an experiment or simulation.

C. Third Embodiment

Figure 10:
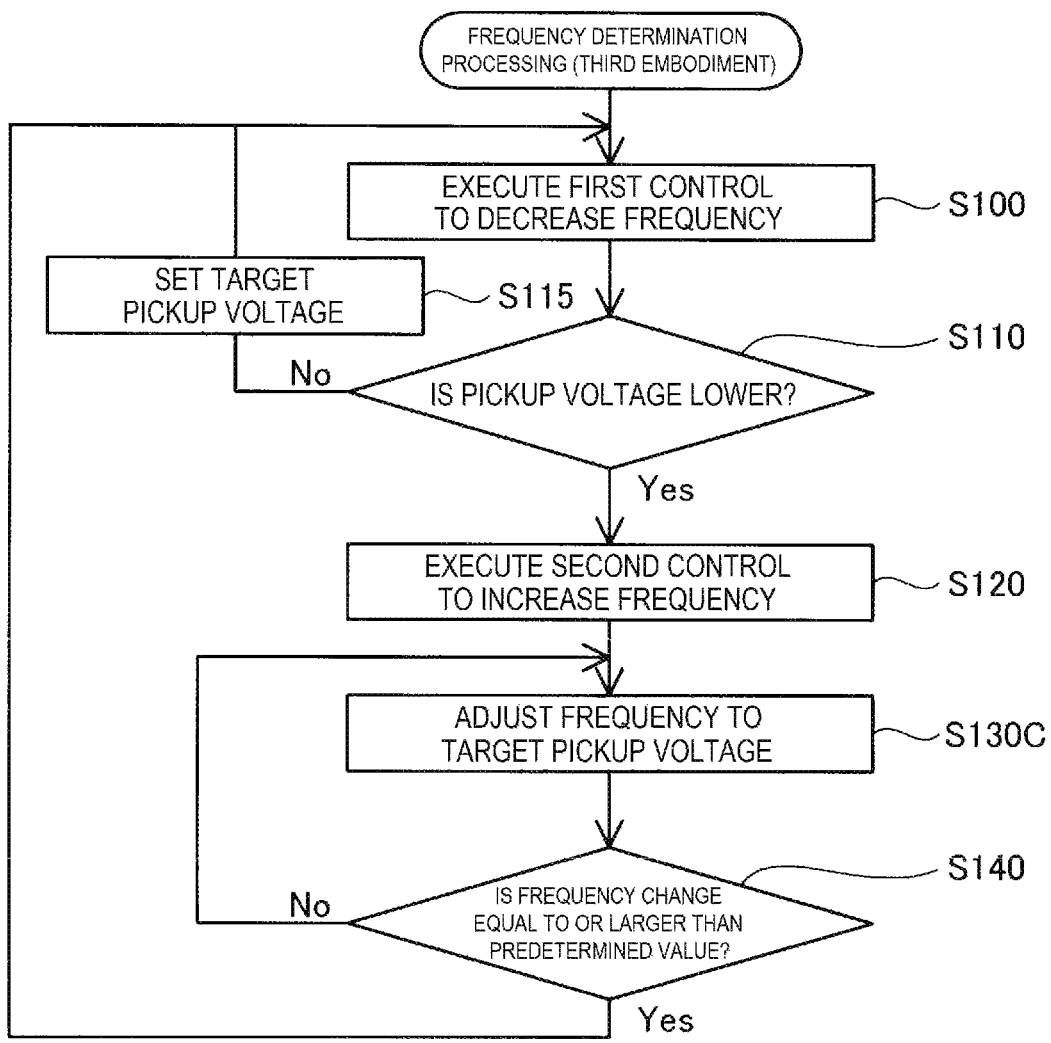
FIG. 10 is a flowchart of frequency determination processing in a third embodiment.
Figure 11:
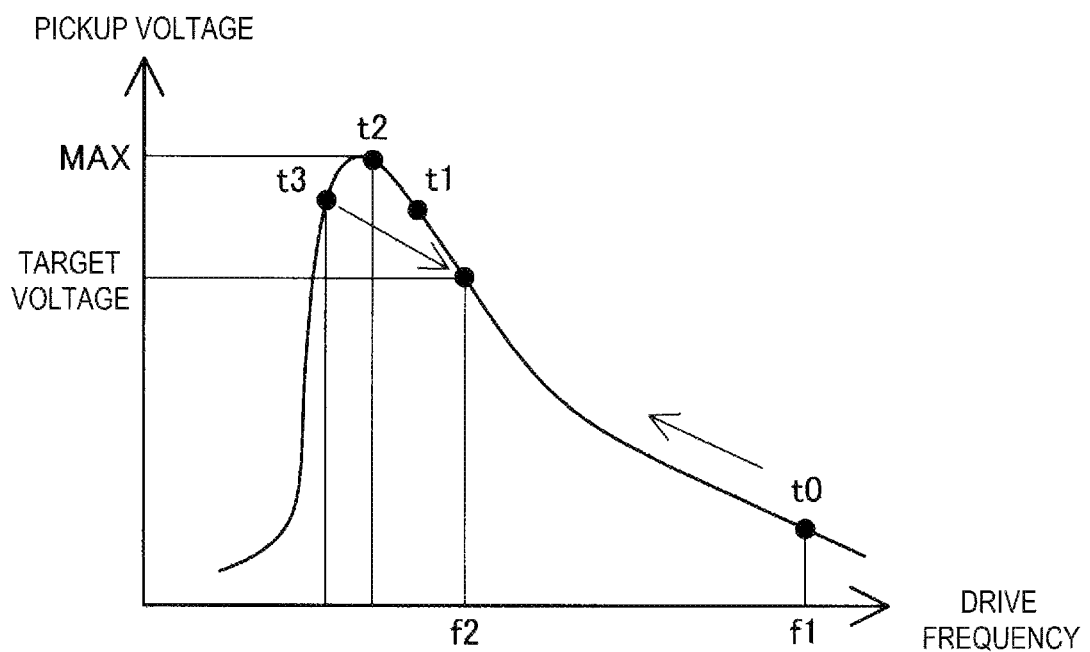
FIG. 11 is an explanatory diagram showing details of processing of the frequency determination processing in the third embodiment.

FIG. 10 is a flowchart of frequency determination processing in a third embodiment. FIG. 11 is an explanatory diagram showing details of processing of the frequency determination processing in the third embodiment. The configuration of the piezoelectric drive device 400 in the embodiment is the same as that of the first embodiment, however, part of the processing of the frequency determination processing is different. Accordingly, as below, the explanation of the configuration of the piezoelectric drive device 400 will be omitted and differences from the first embodiment will be explained regarding the frequency determination processing.

In the third embodiment, in the frequency determination processing, the control unit 300 executes the first control at step S100 to decrease the drive frequency. Then, at step S110, the control unit 300 determines whether or not the pickup voltage becomes smaller by the first control. Note that, in place of the processing at step S110, processing at step S110B in the second embodiment may be executed.

At step S110, when a determination that the pickup voltage is not smaller is made, the frequency adjusted at step S100 does not reach the resonance frequency. In this case, the control unit 300 sets a target pickup voltage at step S115, and then, returns the processing to step S100. For example, the target pickup voltage may be set to a pickup voltage at the time when step S115 is executed. Further, an upper limit value for the target pickup voltage may be set in advance and, when the current pickup voltage exceeds the upper limit value, the upper limit value may be set as the target pickup voltage. The upper limit value of the target pickup voltage may be set to e.g. a value as 50% to 70% of the theoretical maximum value of the pickup voltage.

At step S110, when a determination that the pickup voltage was smaller is made, at step S120, the control unit 300 executes the second control to increase the drive frequency to the second frequency f2 as is the case with the first embodiment. Then, at step S130C, as shown in FIG. 11, the control unit 300 adjusts the second frequency f2 so that the pickup voltage may coincide with the target pickup voltage set at step S115.

According to the above described control method for the piezoelectric drive device 400 of the third embodiment, in the process of the execution of the first control to decrease the drive frequency, the pickup voltage as a target is set and the drive frequency is set so that the pickup voltage having the drive frequency increased by the second control may be the target pickup voltage. Accordingly, the piezoelectric vibrator 100 may be driven at desired pickup voltage and drive frequency.

D. Fourth Embodiment

Figure 12:
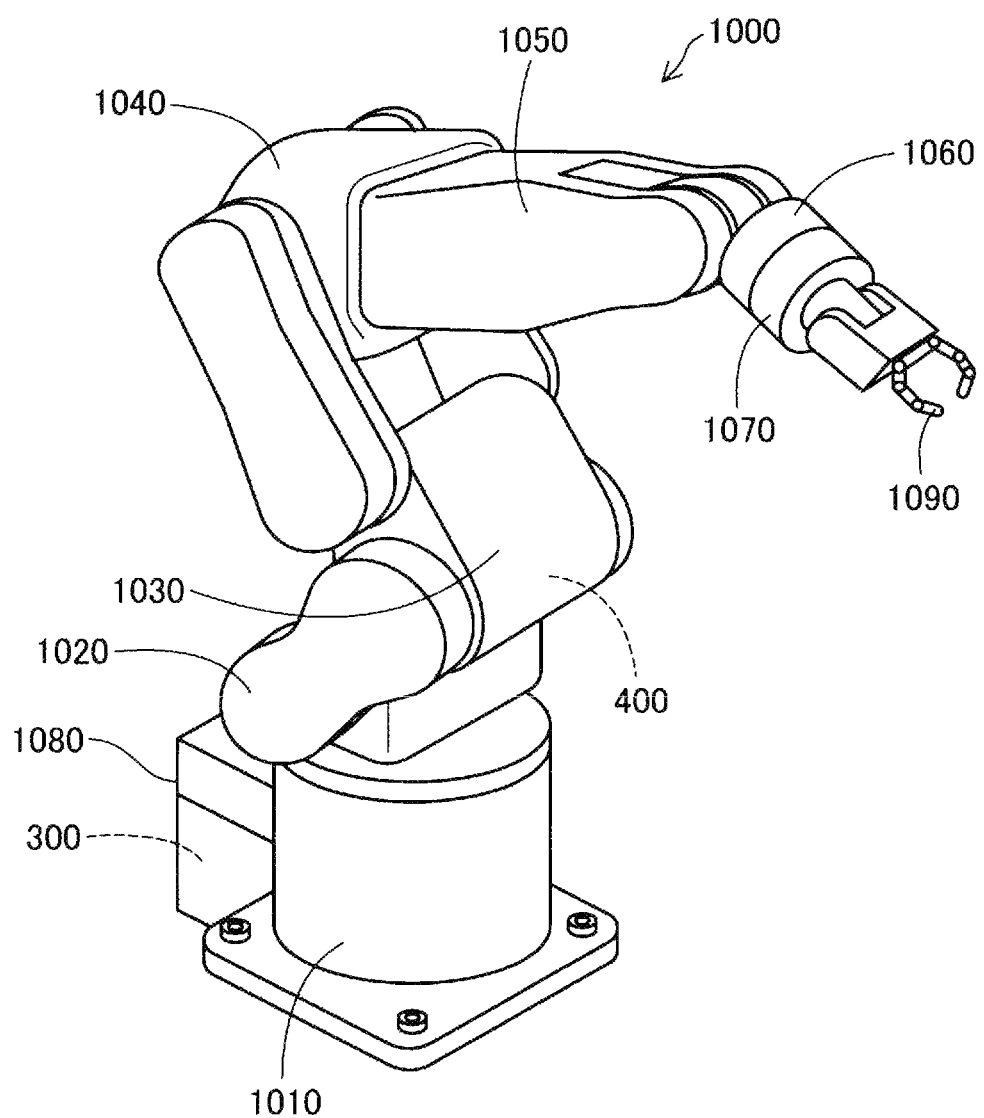
FIG. 12 is a perspective view showing a robot according to a fourth embodiment.

FIG. 12 is a perspective view showing a robot 1000 according to a fourth embodiment. The robot 1000 is a six-axis robot, and has a base 1010 fixed to a floor or a ceiling, arms 1020, 1030, 1040, 1050, 1060, 1070 pivotably coupled to the base 1010, and a robot control unit 1080 that controls driving of these arms 1020, 1030, 1040, 1050, 1060, 1070. The control unit 300 is provided in the robot control unit 1080. A hand coupling portion is provided in the arm 1070 and an end effector 1090 according to work to be executed by the robot 1000 is attached to the hand coupling portion.

The piezoelectric drive devices 400 are provided in all or part of joint portions coupling the respective arms. The piezoelectric drive devices 400 pivot the respective arms 1020, 1030, 1040, 1050, 1060, 1070. Driving of the respective piezoelectric drive devices 400 is controlled by the robot control unit 1080. The piezoelectric drive device 400 may be provided in the end effector 1090 and used for driving the end effector 1090. Note that the robot 1000 is not limited to a vertical articulated robot such as the six-axis robot, but may be a horizontal articulated robot.

E. Other Embodiments (E-1) In the above described embodiments, the control unit 300 executes the third control to fix the pickup voltage after increasing the drive frequency in the second control. On the other hand, the execution of the third control is not essential, but the control unit 300 may drive the piezoelectric vibrator 100 at the drive frequency increased in the second control afterwards.

(E-2) In the above described embodiments, the control unit 300 increases the drive frequency to the second frequency f2 of the drive voltage applied to the piezoelectric vibrator 100 before the first time t1 in the second control. On the other hand, the control unit 300 may increase the drive frequency to a frequency applied to the piezoelectric vibrator 100 at the second time t2 or the first time t1. Or, the control unit 300 may increase the drive frequency to a frequency applied to the piezoelectric vibrator 100 after the first time t1 and before the second time t2.

(E-3) In the above described embodiments, the second frequency f2 set by the control unit 300 in the second control is lower than the first frequency f1 as the drive frequency at the start of the first control. On the other hand, the second frequency f2 may be a frequency higher than the first frequency f1 depending on the value of the first frequency f1.

(E-4) In the above described embodiments, the control unit 300 executes the first control again when the frequency changes by the predetermined value or more when the drive frequency is adjusted to fix the pickup voltage in the third control. On the other hand, it is unnecessary for the control unit 300 to perform the processing. That is, even when the frequency changes by the predetermined value or more as a result of the adjustment of the drive frequency to fix the pickup voltage, the adjustment may be continued without execution of the first control.

F. Other Aspects

The present disclosure is not limited to the above described embodiments, but may be realized in various aspects without departing from the scope thereof. For example, the technical features in the embodiments corresponding to the technical features in the respective aspects described as below can be appropriately replaced or combined for solving part or all of the above described problems or achieving part or all of the above described effects. Further, the technical features may be appropriately deleted unless the technical features are described as essential features in the specification.

(1) According to a first aspect of the present disclosure, a control method for a piezoelectric drive device including a piezoelectric vibrator is provided. The control method includes a first step of executing first control to decrease a frequency of a drive voltage applied to the piezoelectric vibrator from a predetermined first frequency while acquiring a pickup voltage representing vibration amplitude of the piezoelectric vibrator, and a second step of executing second control to increase the frequency of the drive voltage applied to the piezoelectric vibrator to a second frequency as a frequency of the drive voltage applied before a second time when the pickup voltage is higher from a first time to the second time and the pickup voltage is lower from the second time to a third time.

According to the configuration, the drive frequency of the piezoelectric vibrator may be set without using target amplitude, and thus, the drive frequency of the piezoelectric vibrator may be appropriately set with the suppressed influence by temperature changes of the piezoelectric vibrator or the like.

(2) In the control method for the piezoelectric drive device according to the above described aspect, the second frequency may be a frequency of the drive voltage applied to the piezoelectric vibrator before the first time. According to the configuration, the drive frequency of the piezoelectric vibrator lower than the resonance frequency may be suppressed more reliably.

(3) In the control method for the piezoelectric drive device according to the above described aspect, the second frequency may be lower than the first frequency. According to the configuration, the piezoelectric vibrator may be efficiently driven.

(4) In the control method for the piezoelectric drive device according to the above described aspect, a third step of executing third control to adjust the second frequency to fix the pickup voltage is provided after the second step, wherein the first step may be executed again when an amount of change of the second frequency is equal to or larger than a predetermined value at the third step. According to the configuration, even when the operating characteristics of the piezoelectric vibrator vary due to temperature changes or the like, the drive frequency may be appropriately reset.

(5) In the control method for the piezoelectric drive device according to the above described aspect, the second control may be executed at the second step when the pickup voltage is larger from the first time to the second time and an amount of change of the pickup voltage from the second time to the third time is equal to or larger than a predetermined value in the first control. According to the configuration, the drive frequency may be set to an appropriate value after reliable detection of the drive frequency lower than the resonance frequency.

(6) According to a second aspect of the present disclosure, a piezoelectric drive device that drives a driven member is provided. The piezoelectric drive device includes a piezoelectric vibrator that drives the driven member, and a control unit, wherein the control unit executes first control to decrease a frequency of a drive voltage applied to the piezoelectric vibrator from a predetermined first frequency while acquiring a pickup voltage representing vibration amplitude of the piezoelectric vibrator from the piezoelectric vibrator, and second control to increase the frequency of the drive voltage applied to the piezoelectric vibrator to a second frequency as a frequency of the drive voltage applied before a second time when the pickup voltage is higher from a first time to the second time and the pickup voltage is lower from the second time to a third time. According to the configuration, the same effects as those of the first embodiment may be exerted.

(7) According to a third aspect of the present disclosure, a robot including the piezoelectric drive device in the above described second aspect is provided. According to the configuration, the same effects as those of the first embodiment may be exerted.

What is claimed is:

1. A control method for a piezoelectric drive device including a piezoelectric vibrator, comprising:
   a first step of executing first control to decrease a frequency of a drive voltage applied to the piezoelectric vibrator from a predetermined first frequency while acquiring a pickup voltage representing vibration amplitude of the piezoelectric vibrator; and
   a second step of executing second control to increase the frequency of the drive voltage applied to the piezoelectric vibrator to a second frequency as a frequency of the drive voltage applied before a second time when, in the first control, the pickup voltage is higher from a first time to the second time and the pickup voltage is lower from the second time to a third time.

2. The control method for the piezoelectric drive device according to claim 1, wherein
   the second frequency is a frequency of the drive voltage applied to the piezoelectric vibrator before the first time.

3. The control method for the piezoelectric drive device according to claim 1, wherein
   the second frequency is lower than the first frequency.

4. The control method for the piezoelectric drive device according to claim 1, further comprising a third step of executing third control to adjust the second frequency to fix the pickup voltage after the second step, wherein
   the first step is executed again when an amount of change of the second frequency is equal to or larger than a predetermined value at the third step.

5. The control method for the piezoelectric drive device according to claim 1, wherein
   the second control is executed at the second step when the pickup voltage is larger from the first time to the second time and an amount of change of the pickup voltage from the second time to the third time is equal to or larger than a predetermined value in the first control.

6. A piezoelectric drive device that drives a driven member, comprising:
   a piezoelectric vibrator that drives the driven member; and
   a control unit, wherein
   the control unit executes
   first control to decrease a frequency of a drive voltage applied to the piezoelectric vibrator from a predetermined first frequency while acquiring a pickup voltage representing vibration amplitude of the piezoelectric vibrator from the piezoelectric vibrator, and
   second control to increase the frequency of the drive voltage applied to the piezoelectric vibrator to a second frequency as a frequency of the drive voltage applied before a second time when, in the first control, the pickup voltage is higher from a first time to the second time and the pickup voltage is lower from the second time to a third time.

7. A robot comprising the piezoelectric drive device according to claim 6.

* * * * *